United States Patent [19]
Aggus et al.

[11] Patent Number: 5,907,612
[45] Date of Patent: May 25, 1999

[54] REMOVABLE BUTTON FOR A KEYPAD

[75] Inventors: Trevor J. Aggus, Lincroft; Bobbie Jo Ridgely, Middletown, both of N.J.

[73] Assignee: Lucent Technologies Inc., Murray Hill, N.J.

[21] Appl. No.: 08/805,185

[22] Filed: Feb. 27, 1997

[51] Int. Cl.⁶ ............................ H04M 1/00; H01H 13/70
[52] U.S. Cl. .................................... 379/368; 200/345
[58] Field of Search ........................ 379/433, 368–370, 379/428; 200/412, 417, 520, 345

[56] References Cited

U.S. PATENT DOCUMENTS 4,556,769  12/1985  Inaba ..................................... 200/345
5,283,408   2/1994  Chen ..................................... 200/520

Primary Examiner—Jack Chiang

[57] ABSTRACT

A button which is removable from and insertable into a keypad from the exterior of a housing containing the keypad. The button fits within an opening of the keypad and is formed with resilient fingers in its side walls. The fingers have interfering flanges at their lower ends. The flanges are chamfered to provide a camming action to deflect the fingers when the button is removed or inserted.

2 Claims, 2 Drawing Sheets

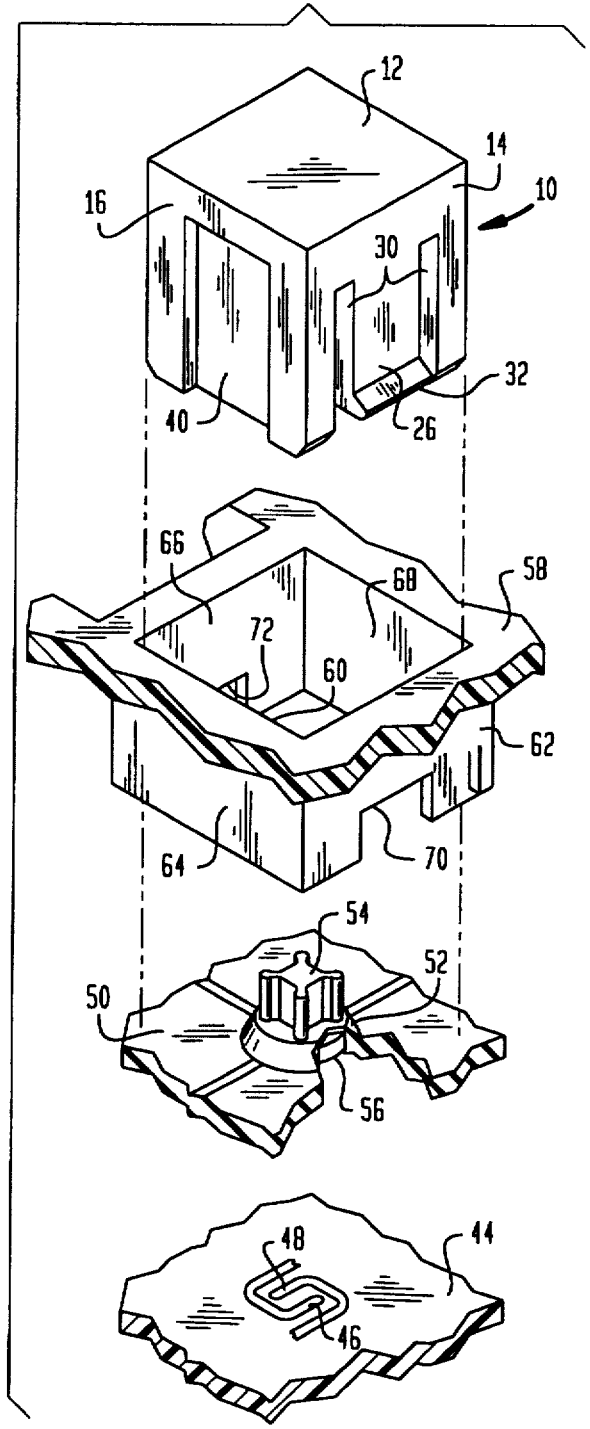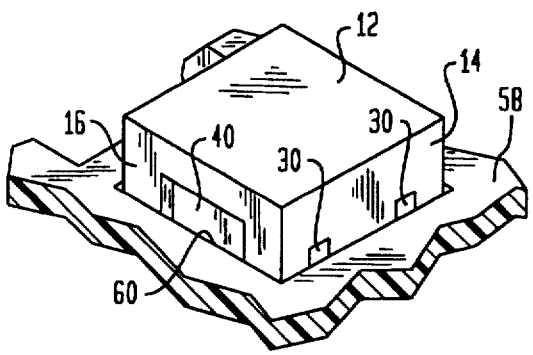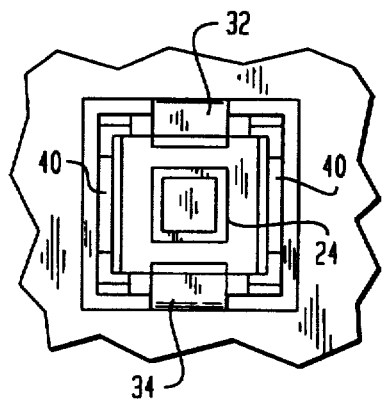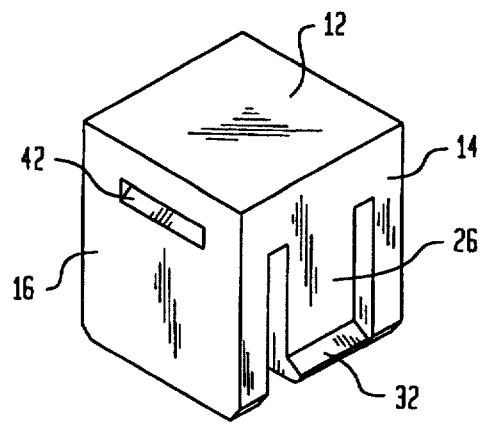

REMOVABLE BUTTON FOR A KEYPAD

BACKGROUND OF THE INVENTION

This invention relates to keypads and, more particularly, to a button which is removable from and insertable into the keypad from the exterior of a housing containing the keypad.

Telephones have keypads which include dial buttons and feature buttons, where the buttons are typically labeled with the dial number or feature identification. When a telephone is used in different countries, the features may have different identifications corresponding to the different languages. In addition, field upgrades as a result of new software may change the features available on the telephone set. It would therefore be desirable to be able to change the keypad buttons to accommodate different labeling.

A common telephone keypad construction includes a printed circuit board having spaced switch terminals thereon. A rubber dome membrane is positioned over the circuit board with carbon pills in aligned registry over pairs of the switch terminals so that depression of a rubber dome and its associated carbon pill results in the bridging of the associated spaced switch terminals (i.e., closure of the associated switch). The rubber dome is formed with an upwardly extending tower above the carbon pill and a keypad button lightly frictionally engages this tower. The keypad housing is formed with an array of openings in positions corresponding to the positions of the switches and is placed over the membrane with the buttons extending through respective ones of the openings. The buttons and the housing have interfering structure so that the buttons cannot be removed upwardly from the housing. Therefore, in order to change a button, the telephone must be disassembled, the button replaced, and the telephone then reassembled. Accordingly, it would be desirable to provide a button construction wherein the button is removable and insertable without requiring the disassembly and subsequent assembly of the telephone while at the same time providing resistance to inadvertent removal of the button.

SUMMARY OF THE INVENTION

According to the present invention, there is provided a keypad wherein the buttons can be removed and inserted without requiring any disassembly and subsequent reassembly. The keypad comprises a switch having an upwardly biased actuator and a housing having an upper planar surface positioned over the switch and with an opening in registration with the switch actuator. The opening is defined by a wall of the housing extending from the surface toward the switch, the wall having a lower edge portion substantially parallel to the surface. The keypad further comprises a removable button insertable through the opening from the surface for cooperation with the switch actuator. The button is of unitary construction and includes a top wall engagable by the user, an actuation member extending downwardly from the top wall and adapted for engagement with the switch actuator, and a side wall extending downwardly from the top wall and surrounding the actuation member. The button periphery defined by the side wall conforms to the periphery of the opening defined by the housing wall. A pair of opposed resilient fingers are formed in the button side wall on opposite sides of the actuation member. Each of the fingers extends downwardly within the thickness of the side wall and terminates in an outwardly extending flange which has its lower surface chamfered upwardly and outwardly so that when the button is inserted into the opening toward the switch, each finger deflects inwardly until the flange passes the lower edge portion of the housing wall and then moves outwardly, thereby providing resistance to inadvertent removal of the button from the opening while allowing the user to deflect the finger inwardly to effect removal of the button. The construction is such that when the flanges are below the lower edge portions of the housing wall the actuation member engages the switch actuator, and in the absence of user engagement of the button top wall the upward bias of the switch actuator maintains the upper surfaces of the flanges against the housing wall lower edge portions and the button top wall above the housing surface.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 5 is an exploded perspective view, partially cut away, showing a portion of a keypad having the button of FIG. 1;

FIG. 6 is a perspective view showing the button of FIG. 1 installed in the keypad;

FIG. 7 is a bottom plan view showing the button of FIG. 1 installed in the keypad housing; and FIG. 8 is a perspective view showing an alternate embodiment of the inventive button.

DETAILED DESCRIPTION

Figure 1:
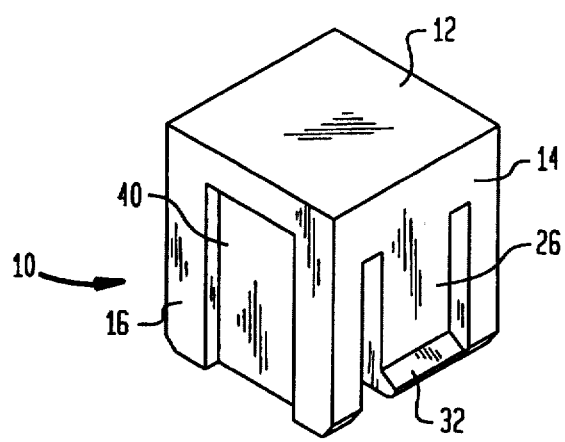
FIG. 1 is a perspective view of a first embodiment of a removable button constructed in accordance with the principles of this invention.
Figure 2:
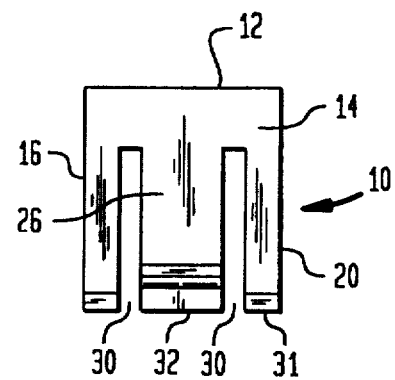
FIG. 2 is a front elevational view of the button of FIG. 1.
Figure 3:
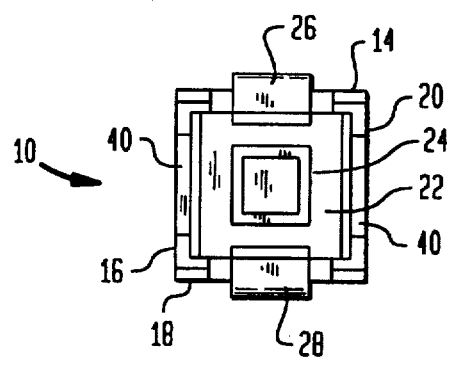
FIG. 3 is a bottom plan view of the button of FIG. 1.

Referring now to the drawings, the removable button according to the present invention, designated generally by the reference numeral 10, is of unitary construction, preferably of molded resilient plastic material. The button 10 includes a top wall 12 engagable by a finger of a user. Illustratively, the top wall 12 is rectangular and there are four side walls 14, 16, 18, 20 extending downwardly from the top wall 12 to form an interior cavity 22. As shown, the plane of the top wall 12 is orthogonal to the planes of the side walls 14, 16, 18, 20, but it is understood that the top wall 12 can be slanted, can be concave, can be convex, or have any desired topography.

Extending downwardly from the top wall 12 within the cavity 22 is an actuation member 24, the purpose of which will be described in full detail hereinafter. Suffice it to say at this point that the illustrated actuation member 24 is a four-sided hollow tubular structure whose walls are parallel to the side walls 14, 16, 18, 20, it being understood that other shapes, such as cylindrical, are possible for the actuation member 24.

Figure 4:
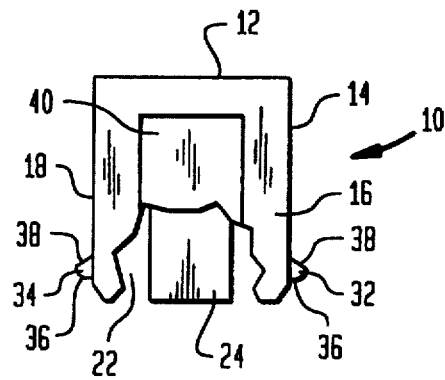
FIG. 4 is a side elevational view of the button of FIG. 1.

On the opposed non-adjacent side walls 14 and 18, on opposite sides of the actuation member 24, there are formed resilient fingers 26, 28, respectively. The fingers 26, 28 extend downwardly within the thickness of their respective side walls from a region below the top wall 12. In the case of the finger 26, the finger 26 may be formed from the side wall 14 by providing a pair of flanking parallel and equal length slits 30 which extend upwardly from the bottom edge 31 of the button 10. The fingers 26, 28 terminate at their lower ends in outwardly extending flanges 32, 34, respectively. As best shown in FIG. 4, the lower surface 36 of the flange 32 is chamfered upwardly and outwardly and the upper surface 38 of the flange 32 is chamfered downwardly and outwardly. The flange 34 is similarly shaped.

As shown in FIG. 1, the side wall 16 is formed with a depression 40 which terminates closely adjacent the top wall 12. A similar depression (not shown) is formed in the opposed non-adjacent side wall 20. In the embodiment shown in FIG. 1, the depression 40 extends all the way down the side wall 16 to the bottom edge 31 of the button 10. In the alternate embodiment shown in FIG. 8, the corresponding depression 42 has a relatively small extent down the side wall 16. The function of the depressions 40, 42 will be described in full detail hereinafter.

The removable button 10 according to the present invention is designed to be used in a keypad such that user depression of the button 10 results in closure of a switch. As shown in FIG. 5, the illustrative keypad environment includes a printed circuit board 44 having spaced switch terminals 46, 48 deposited or otherwise provided thereon. Overlying the circuit board 44 is a rubber dome membrane 50. The membrane 50 is unitarily formed with an upwardly biased dome 52 and a tower 54 extending upwardly from the dome 52. Captured within a cavity on the underside of the dome 52 is a carbon pill 56. The membrane 50 is positioned over the circuit board 44 so that the carbon pill 56 is in aligned registry over the switch terminals 46, 48. Accordingly, depression of the dome 52 causes the carbon pill 56 to bridge the spaced switch terminals 46, 48, resulting in closure of the switch. Thus, the combination of the dome 52, the tower 54 and the carbon pill 56 functions as an upwardly biased switch actuator. The circuit board 44 and the membrane 50 are contained within a housing having an upper planar surface 58 and an opening 60 over the aforedescribed switch. The opening 60 is centrally positioned over the dome 52. Illustratively, the opening 60 is rectangular and is defined by the side walls 62, 64, 66, 68, extending downwardly from the upper surface 58. The side walls 62, 66 have respective lower edge portions 70, 72 substantially parallel to the surface 58. These lower edge portions 70, 72 cooperate with the flanges 32, 34, respectively, as will be described in full detail hereinafter.

When the button 10 is installed into the opening 60, the actuation member 24 of the button 10 lightly frictionally engages the tower 54 of the membrane 50, with the tower 54 fitting within the interior of the actuation member 24. Depression of the button 10 by the operator exerting a downward pressure on the top wall 12 results in the lower edge of the actuation member 24 pressing downwardly on the dome 52, deforming the dome 52 and causing the carbon pill 56 to contact and bridge the spaced switch terminals 46, 48. Release of the downward pressure on the top wall 12 results in the dome 52 returning to its original shape, pulling the carbon pill 56 away from the switch terminals 46, 48, thereby opening the switch and at the same time moving the button 10 upwardly.

To install the button in the keypad, the button 10 is placed within the opening 60 and pushed downwardly. The size of the button 10 and the size of the opening 60 are such that the button 10, with the exception of the flanges 32, 34 fits with slight clearance within the opening 60, the flanges 32, 34 extending outwardly beyond the periphery of the opening 60. When the button 10 is placed over the opening 60 and pushed downwardly, the lower surfaces 36 of the flanges 32, 34 engage the periphery of the opening 60 at the upper corners of the walls 62, 66. Since those lower surfaces 36 are chamfered upwardly and outwardly, downward pressure on the button 10 results in the resilient fingers 26, 28 deflecting inwardly, allowing the button 10 to enter the opening 60 with the flanges 32, 34 sliding against the inner surfaces of the walls 62, 66, respectively. As the flanges 32, 34 pass the lower edge portions 70, 72, the fingers 26, 28 move outwardly. In this position of the button 10, the tower 54 of the dome 52 is within the actuating member 24, with the carbon pill 56 spaced above the switch terminals 46, 48. In this position, the dome 52 exerts insufficient upward force to move the flanges 32, 34 from their positions of engagement with the lower edge portions 70, 72, thereby maintaining the button 10 with its top wall 12 extending above the upper surface 58 of the housing (FIG. 6) and the switch open. The upper surfaces 38 of the flanges 32, 34 engage the lower edge portions 70, 72 to provide resistance against inadvertent removal of the button 10, the upward biasing force of the dome 52 being insufficient to cause inward deflection of the fingers 26, 28.

As best shown in FIG. 6, when the top wall 12 of the button 10 is not engaged by a finger of a user, the top wall 12 is above the upper surface 58 of the housing, exposing upper regions of the side walls 14, 16, 18, 20. In particular, the dimensions of all of the elements are such that at least a portion of the depressions 40, 42 are exposed when the button 10 is in its non-engaged position. These portions of the depressions 40, 42 allow the user to firmly engage the side walls 16, 20 when it is desired to remove the button 10. Accordingly, when it is so desired, the button 10 is gripped and pulled upwardly, the downward and outward chamfering of the upper surfaces 38 of the flanges 32, 34 engaging the inner corners of the lower edge portions 70, 72 so that the fingers 26, 28 are deflected inwardly to allow the flanges 32, 34 to move within the periphery of the opening 60 and slide against the inner surfaces of the walls 62, 66. Thus, while under normal use the flanges 32, 34 resist inadvertent removal of the button 10, when desired the button 10 is readily removable and replaceable.

Accordingly, there has been disclosed a button which is removable from and insertable into a keypad from the exterior of a housing containing the keypad. While illustrative embodiments have been disclosed herein, it is understood that other embodiments and modifications may be apparent to those of ordinary skill in the art and it is intended that this invention be limited only by the scope of the appended claims.

What is claimed is:

1. A keypad comprising:

a switch having an upwardly biased actuator;

a housing having an upper planar surface positioned over said switch and with a rectangular opening in registration with said switch actuator, said opening being defined by four walls extending from said surface toward said switch, each of said walls having a lower edge portion substantially parallel to said surface; and a removable button insertable through said opening from said surface for cooperation with said switch actuator, said button being of unitary construction and including:

a top wall engagable by a user;

an actuation member extending downwardly from said top wall and adapted for engagement with said switch actuator;

four exterior side walls extending downwardly from said top wall and surrounding said actuation member, the periphery defined by said side walls conforming to the periphery of said opening defined by said housing walls; and a pair of opposed resilient fingers formed in a first pair of opposed non-adjacent ones of said side walls on opposite sides of said actuation member, each of said fingers extending downwardly within the thickness of said side wall and terminating in an outwardly extending flange which has its lower surface chamfered upwardly and outwardly and its upper surface chamfered downwardly and outwardly so that when said button is inserted into said opening toward said switch each finger deflects inwardly until its flange passes the lower edge portion of a respective housing wall and then moves outwardly, thereby providing resistance to inadvertent removal of the button from the opening while allowing a user to deflect the finger inwardly to effect removal of the button, each of said other pair of opposed non-adjacent side walls being formed with a depression in its outer surface which has at least a portion located above said housing surface in the absence of user engagement of said button top wall and each depression being terminated at its upper end below said top wall;

wherein when said flanges are below said lower edge portions of the housing wall said actuation member engages said switch actuator, and in the absence of user engagement of said button top wall the upward bias of said switch actuator maintains the upper surfaces of the flanges against said housing wall lower edge portions and said button top wall above said housing surface with said depression upper ends being exposed above said housing upper surface;

whereby each of the depressions provides an engagement surface for the upward removal of the button from the opening.

2. A removable button for a keypad, said button being of unitary resilient plastic material construction and comprising:

an upper engagement wall; and four exterior side walls extending downwardly from said engagement wall to a bottom edge of said button;

wherein a pair of non-adjacent ones of said four side walls are each formed with a pair of parallel equal length slits extending upwardly from said bottom edge to form a resilient finger between said pair of slits;

wherein each of said fingers is formed with an outwardly extending flange adjacent said bottom edge, said flange having its upper surface chamfered downwardly and outwardly and its lower surface chamfered upwardly and outwardly; and wherein a pair of non-adjacent ones of said four side walls not having said fingers are each formed with a depression on its outer surface, which depression is terminated at its upper end near said upper engagement wall.

* * * * *